US012319056B2

(12) United States Patent
Rodriguez Alonso et al.

(10) Patent No.: US 12,319,056 B2
(45) Date of Patent: Jun. 3, 2025

(54) INTERFERENTIAL PATTERNS FOR ALIGNMENT CALIBRATION OF PRINTHEADS

(71) Applicant: Hewlett-Packard Development Company, L.P., Spring, TX (US)

(72) Inventors: Raul Rodriguez Alonso, Sant Cugat del Valles (ES); Marti Rius Rossell, Sant Cugat del Valles (ES); Leyre Hernandez Martinez, Sant Cugat del Valles (ES); Victor Serra Fernandez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 197 days.

(21) Appl. No.: 18/180,340

(22) Filed: Mar. 8, 2023

(65) Prior Publication Data

US 2024/0300235 A1 Sep. 12, 2024

(51) Int. Cl.

| | |
|---|---|
| ***B41J 2/045*** | (2006.01) |
| ***B41J 3/54*** | (2006.01) |
| ***B41J 11/00*** | (2006.01) |

(52) U.S. Cl.
CPC .......... *B41J 2/04505* (2013.01); *B41J 3/543* (2013.01); *B41J 11/008* (2013.01)

(58) Field of Classification Search
CPC ...... B41J 2/04505; B41J 3/543; B41J 11/008; B41J 2/04526; B41J 2/12; B41J 2/13; B41J 2/04508; B41J 2/04535; B41J 2/0454; B41J 2/04563; B41J 2/04596
See application file for complete search history.

(56) References Cited

U.S. PATENT DOCUMENTS

2007/0229923 A1* 10/2007 Itagaki ............... H04N 1/00002 358/1.9
2014/0126000 A1* 5/2014 Chong ................ G06K 15/027 358/1.8
2017/0153006 A9* 6/2017 Jigamian .................. F21V 9/04

* cited by examiner

*Primary Examiner* — Kristal Feggins
(74) *Attorney, Agent, or Firm* — Jordan IP Law, LLC

(57) ABSTRACT

An interferential pattern is printed to a print media using an upper row die. A first portion of an additional interferential pattern is printed to a print media using a lower row die. A second portion of the additional interferential pattern is printed to the print media using the upper row die. An alignment error between the upper row die and the lower row die is determined based on interferential pattern and the additional interferential pattern.

15 Claims, 10 Drawing Sheets

INTERFERENTIAL PATTERNS FOR ALIGNMENT CALIBRATION OF PRINTHEADS

BACKGROUND

A printing device, such as, an ink-jet printer, may comprise multiple printheads to deposit a printing fluid to a print medium. The multiple printheads may be arranged in rows and mounted on a printhead carriage such that the printing fluid is deposited on the print medium. The print medium may be advanced, thereby generating a printed image.

BRIEF DESCRIPTION OF THE DRAWINGS

Various examples will be described below by referencing the following drawings, in which.

DETAILED DESCRIPTION

Certain examples described herein provide example techniques for generating and analyzing example interferential patterns (which may also be referred to as interference patterns) for printhead alignment calibration. According to the techniques described herein, in one example, generated interferential patterns may be scanned, for example, using a line sensor, and measured errors in the interferential patterns may be used to determine media advance errors and/or misalignment between dies of respective printheads. Counteracting measures may be utilized to mitigate media advance errors and any misalignment.

Figure 1:
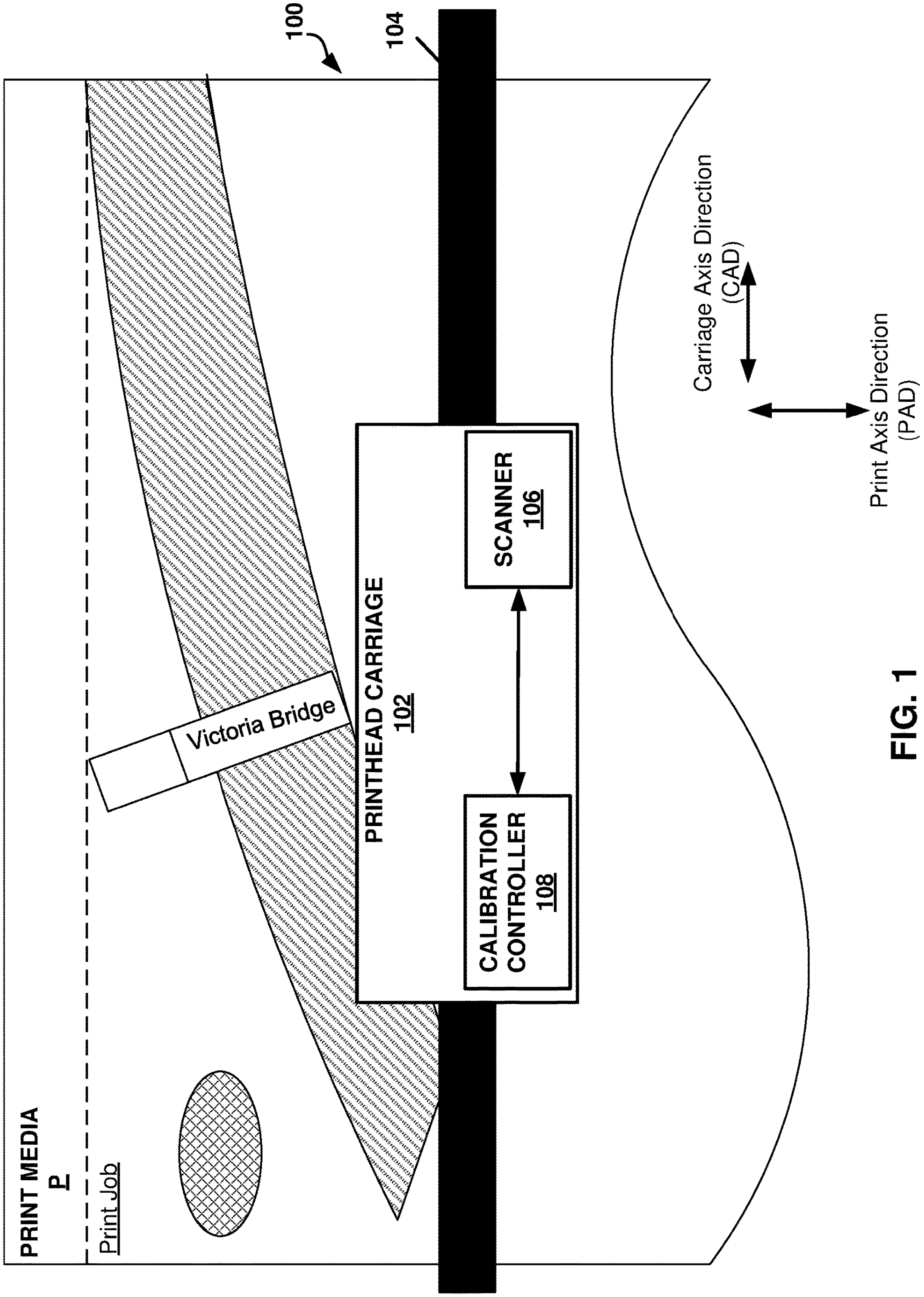
FIG. 1 is an illustration of an example printer device according to an example.

FIG. 1 is an illustration of a printer device 100 according to an example. In the example illustrated in FIG. 1, printer device 100 comprises a printhead carriage 102, a scanner 106, and a calibration controller 108. As further illustrated in FIG. 1, printhead carriage 102 is supported by member 104. Member 104 may include a rail or the like. In the example of FIG. 1, printhead carriage 102 is supported by member 104 and able to move across the width of a print media P in a carriage axis direction (CAD). Print medium P advances underneath printhead carriage 102 in a print axis direction (PAD). The print media may comprise a sheet or continuous web of media and may include any form of print media, including, but not limited to, paper, cardboard (i.e. corrugated media), fabric, polymer films, and the like.

As described in further detail below, for example, with respect to FIG. 2, printhead carriage 102 may include a plurality printheads, where a printhead comprises a die forming a plurality of nozzles. The nozzles may be aligned in one or more columns along a length of a printhead e.g., in a direction parallel to the PAD. For example, printhead carriage 102 may comprise a plurality of ink-jet printheads. A printing fluid, including, for example, ink or a modelling agent, may be ejected through the nozzles of the printhead. In this manner, printheads included in printhead carriage 102 may deposit ink onto print media P thereby printing an image corresponding to a print job. It should be noted that in other examples, a printhead may include a thermal or piezo-electric printhead. Further, it should be noted that ink is used herein as an example, and in other examples, other printing fluids, such as, pre-printing and post-printing agents (e.g. varnishes, glosses, under-treatments) may alternatively be deposited.

As described in further detail below, in one example, a plurality of printheads may be arranged in two or more rows, which may be staggered. It should be noted that although printer device 100 is described as including a printhead carriage which traverses a print media in the CAD, in other examples, printhead carriage 102 may form part of a page wide array printer. In the example of a page wide array printer, a printhead carriage may be fixed about the CAD and printheads may extend across the width of a print medium. In this case, a position of a printed image on a print medium may be controlled through activation of different nozzles along the width of the page wide array. Further, in one example, printer device 100 may be configured such that printhead carriage 102 is able to traverse a print media in the CAD and the PAD. For example, in one example, printer device 100 may be configured such that member 104 is able to travel in the PAD. The techniques described herein may be equally applicable to a printhead carriage that traverses a print media about one or more directions or a printhead carriage that is fixed about one or more directions.

As further illustrated in FIG. 1, printer device 100 includes scanner 106 and calibration controller 108. Scanner 106 may be configured to scan a printed image. Scanner may include a reflectance sensor that is arranged to measure an intensity of reflected light (including, e.g., infrared light). For example, scanner 106 may include an emitter to emit light and sensor to measure an intensity of light that is reflected from a surface (e.g., the print medium). The measured intensity of reflected light may indicate whether ink is deposited to the corresponding location of a print media. For example, light reflected from black ink would have a lower measured intensity than light reflected from white paper. In this manner, it can be determined if black ink is deposited to a particular location of the white paper. In one example, scanner 106 may comprise a line sensor. A line sensor may output a measured light intensity value for a given field of view. In one example, a field of view may be between 1 and 3 mm in both directions. Further, scanner 106 may output an array of light intensity values that correspond to different lateral positions across the width of a print medium. In one example, an array may comprise a one dimensional array of length n, where n equals a number of measurements corresponding to a number of spatial positions across a width a print medium. For example, n may equal 1000. Further, it should be noted that in some examples, printer device 100 may be configured such that several scans at different positions (e.g., PAD positions) may be performed. In this manner, as described in further detail below, based on values measured by scanner 106, it may be determined whether an interferential image has been correctly printed to a print media.

It should be noted that although in the example illustrated in FIG. 1, scanner 106 is illustrated as being mounted to printhead carriage 102, in other examples, scanner 106 may be mounted to an independent carriage, which may be movable about one or more directions. Further, in other examples, scanner 106 may extend across the width of a print medium, e.g., in the case of a page wide array printer. In other examples, scanner 106 may be configured to capture light that is emitted by another component. As described in further detail below, scanner 106 may be mounted to printhead carriage 102 at a position corresponding to a particular nozzle position.

As illustrated in FIG. 1, scanner 106 is illustrated as operating in conjunction with calibration controller 108. It should be noted that in FIG. 1, calibration controller 108 is illustrated as being located on printhead carriage 102 in proximity to scanner 106. Such an illustration is for the sake of illustrative purposes. That is, calibration controller 108 may be located at various locations within or in proximity to printer device 100 or may be physically independent of printer device 100. For example, calibration controller 108 may comprise a computer system that is electronically coupled or otherwise in communication (e.g., wirelessly) with printer device and/or scanner 106. In one example, calibration controller 108 may comprise a printed circuit board and/or integrated circuitry. Further, in one example, calibration controller 108 may form part of a control subsystem that is electronically-coupled to a wider control system, e.g., calibration controller 108 may be coupled over a system bus to other printed circuit boards. In one example, calibration controller 108 may comprise a processor in the form of a central processing unit, microprocessor or system-on-chip device. Calibration controller 108 may include a memory and/or be electronically coupled to a memory (not shown in FIG. 1). A memory may comprise volatile and/or non-volatile memory. In some examples, the memory may comprise non-volatile memory to store instructions for the calibration controller 108 and configuration data for the printing system. Further, Instructions and/or data may be transferred from the non-volatile memory to the volatile memory during operation, wherein, for example, a processor of the calibration controller 108 may access data and instructions stored in the volatile memory. The volatile memory may comprise any form of Random Access Memory (RAM) and the non-volatile memory may comprise solid-state memory, magnetic storage devices, and/or Read Only Memory (ROM), amongst others. Instructions stored in memory may be loaded and executed by a processor of the calibration controller 108 to effect the functionality described herein.

As described in further detail below, for example with respect to FIGS. 5A-5B, interferential patterns may be generated according to the techniques described herein. Memory accessible to calibration controller 108 may store a definition of interferential patterns. In one example, a definition may comprise an image to be printed, e.g., in the form of a bitmap or the like. In another example, a definition may comprise a function definition to generate an interferential pattern. In this case, the definition may comprise program code and parameter values that control the printhead carriage and/or printheads thereof to produce an image of an interferential patterns on a print medium. In any case, the calibration controller 108 is configured to obtain a definition of interferential pattern from a memory and to instruct or cause printing of an interferential pattern to print media.

In the example illustrated in FIG. 1, calibration controller 108 is further configured to receive data (for example, data values corresponding to a set of intensity measurement) from scanner 106. As described above, measurements from scanner 106 may indicate whether ink has been deposited to a corresponding location of a print media. Thus, as described in further detail below, in the case where an interferential pattern is printed to a print media, data received from scanner 106 corresponds to an analysis of a printed interferential pattern. That is, for example, an analysis may include errors of a printed interferential pattern with respect to a defined interferential pattern. As described in further detail below, this analysis may be used to determine, for example, media advance errors and/or misalignment between dies. Media advance errors and misalignments between dies may then be corrected, e.g., by configuring an offset or the like.

As described above, printhead carriage 102 may include a plurality of printheads arranged in staggered rows. FIG. 2 is an illustration of an example printhead carriage 200 including printheads arranged in staggered rows according to an example. It should be noted that in some cases printheads may be referred to as pens. As described above, a printhead comprises a die forming a plurality of nozzles. A die, which may also be referred to as a printhead die, may include an integrated circuit structure formed on a silicon substrate. In some examples, dies may be embedded in monolithic moldings. A printhead architecture may define a number of dies per printhead, a number of columns of nozzles per die, and a number nozzles per column. For example, six dies may be located in a single printhead, each die may include four columns of nozzles, and each column of nozzles may include hundreds of nozzles. In some examples, a set of columns of nozzles is associated with a different color, such as cyan, magenta, yellow and black (CMYK). It should be noted that in some cases, a set of columns of nozzles may be referred to as a trench or slot. In the example illustrated in FIG. 2, for Printhead 4, nozzles columns for a trench are illustrated. It should be noted, as described in further detail below, a column of nozzles typically includes hundreds of nozzles, and the illustrated nozzle columns in FIG. 4 represent a simplification for explanatory purposes.

Figure 2:
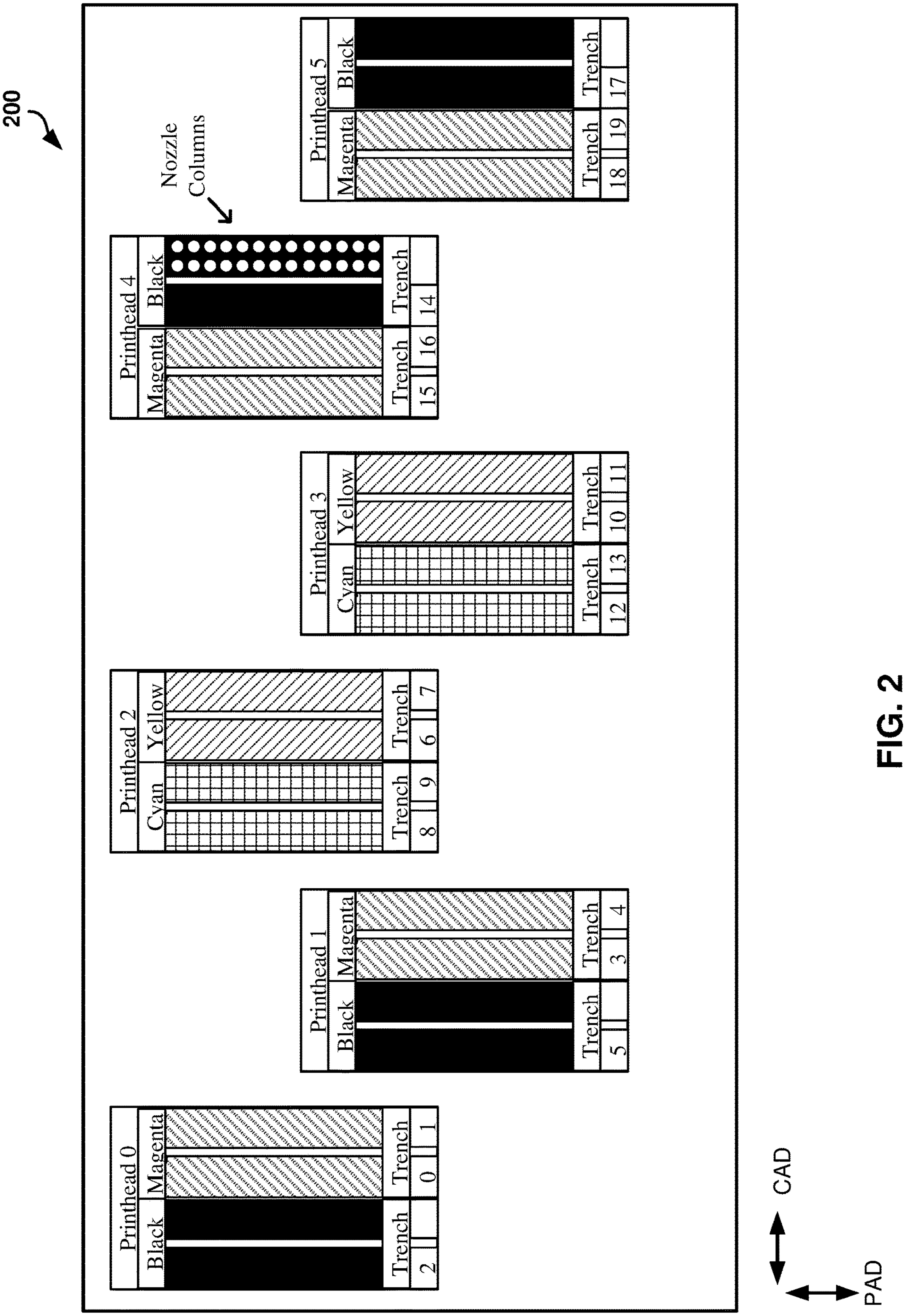
FIG. 2 is an illustration of an example printhead carriage according to an example.

In the example illustrated in FIG. 2, printhead carriage 200 includes six printheads (i.e., Printhead 0-Printhead 5) where each printhead includes three or four trenches and each trench is associated with a color. As illustrated in FIG. 2, Printhead 0, Printhead 2, and Printhead 4 are arranged in a row (hereinafter Row 0) about the CAD and Printhead 1, Printhead 3, and Printhead 5 are arranged in a row (hereinafter Row 1) about the CAD. As further illustrated in FIG. 2, there is overlap about the PAD between the bottoms of Printhead 0, Printhead 2, and Printhead 4 and the tops of Printhead 1, Printhead 3, and Printhead 5. In this manner, the printheads in printhead carriage 200 are arranged in staggered rows. It should be noted that although the example illustrated in FIG. 2 illustrates two staggered rows, in other examples printhead carriage 200 may include two or more rows of printheads. As such, the techniques described herein may be equally applicable to a printhead carriage including any number of rows of printheads.

As described above, a printhead includes a die having columns of nozzles and printheads in adjacent rows may overlap. Thus, columns of nozzles of printheads may overlap, i.e., form overlap regions. It should be noted that in some cases, overlap regions may also referred to as die stitching regions or overlap zones. It should be noted that in a typical alignment process, a so-called core alignment may be utilized to align printheads within the same row. That is, for example, referring to FIG. 2, during a core alignment, Printhead 2 may be aligned with Printhead 0 about the PAD and Printhead 4 may be aligned with Printhead 2 about the PAD. Similarly, Printhead 3 may be aligned with Printhead 1 about the PAD and Printhead 5 may be aligned with Printhead 3 about the PAD. According to the techniques described herein, misalignment of adjacent rows about the PAD may be detected.

Figure 3:
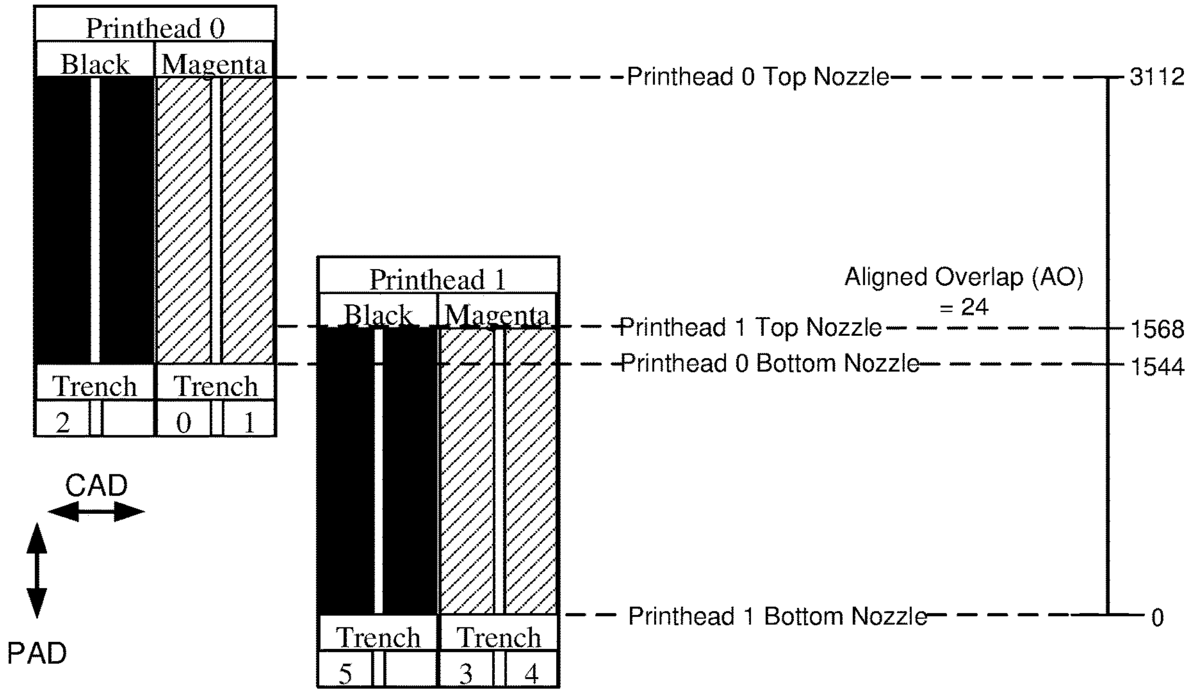
FIG. 3 is an illustration of an alignment of staggered printheads according to an example.

FIG. 3 is an illustration of an alignment of staggered printheads according to an example. FIG. 3 illustrates an example where Printhead 0 and Printhead 1 (and thus, Row 0 and Row 1) are aligned about the PAD. That is, in the example illustrated in FIG. 3, each printhead includes columns of 1568 nozzles and between Row 0 and Row 1 the expected or aligned overlap (AO) is 24 nozzles. In this manner, as illustrated in FIG. 3, the printhead carriage can be said to have an effective length of (or span) 3112 nozzles in the PAD. It should be noted that in other examples, a staggered alignment of printheads with a different effective length of nozzles in the PAD and a different overlap zone than that illustrated in the example of FIG. 3 may be utilized. For example, in one example, a printhead carriage may span 1056 nozzles in the PAD and have an overlap zone of 56 or 112 nozzles. However, in some cases, it is desirable to have a relatively narrow overlap zone (e.g., 24 nozzles vs. hundreds of nozzles) in order to have a wider swath and improve printer productivity. The techniques described herein may be equally applicable to a printhead carriage having various PAD spans and overlap zones.

Figure 4A:
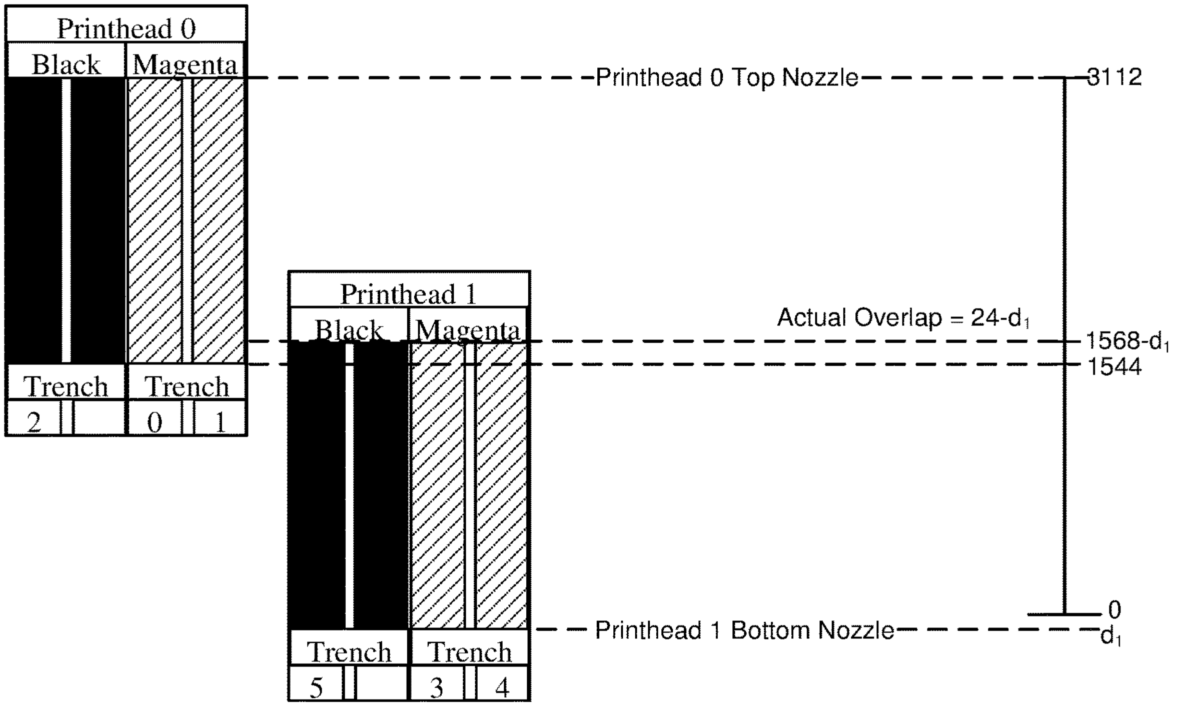
FIGS. 4A-4B are illustrations of misalignments of staggered printheads according to an example.
Figure 4B:
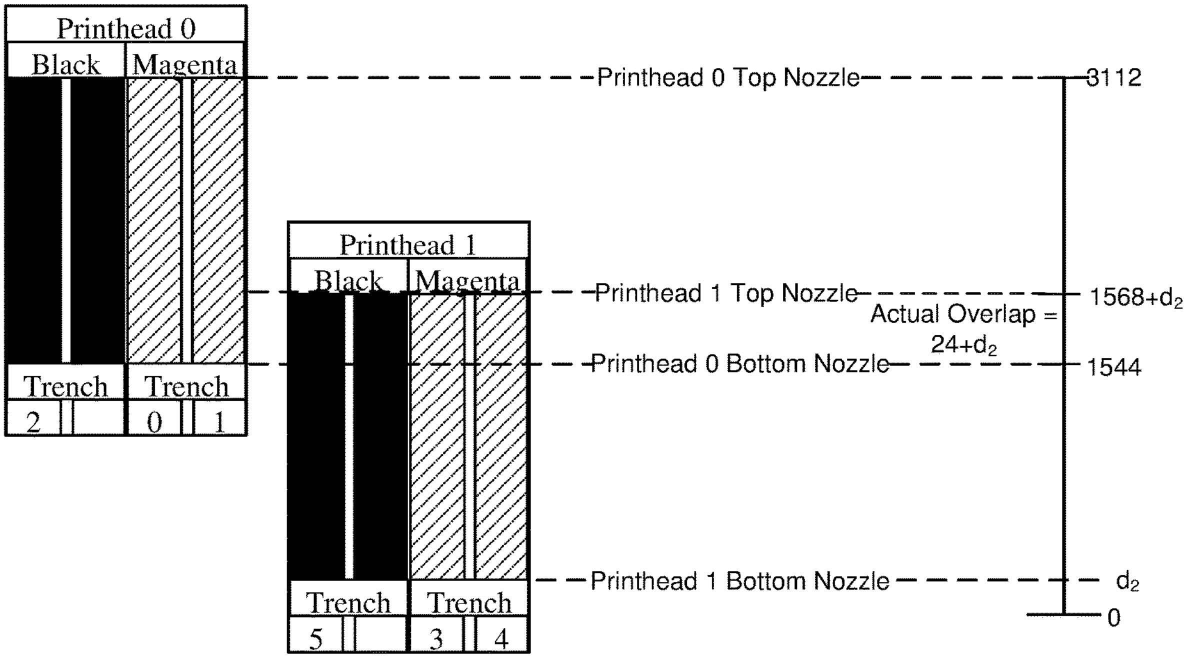

As illustrated in the example of FIG. 3, the expected or aligned overlap (AO) is 24 nozzles. During operation of a printer device, there may be a deviation between the relative position of two adjacent rows in the PAD compared to an expected overlap. FIGS. 4A-4B are illustrations of misalignments of staggered printheads according to an example. In the example illustrated in FIG. 4A, the position of Printhead 1 in the PAD is lower than expected by distance $d_1$. As such, the actual overlap is smaller than the aligned overlap (i.e., $24-d_1$ compared to 24). In the example illustrated in FIG. 4B, the position of Printhead 1 in the PAD is higher than expected by distance $d_2$. As such, the actual overlap is greater than the aligned overlap (i.e., $24+d_2$ compared to 24). It should be noted that in the examples illustrated in FIG. 4A-4B, the position of the top nozzle of Printhead 0 at 3112 is fixed for reference. Alternatively, the position of the bottom nozzle of Printhead 1 at 0 could be fixed for reference. It should be noted that in practice any misalignment between the rows of staggered printheads is very visible in a print job, especially, when one pass print modes are utilized since a white or dark horizontal line appears along the plot. Thus, the misalignment illustrated in FIG. 4A would likely result in a visible white line (i.e., gap) horizontal to the PAD and the misalignment illustrated in FIG. 4B would likely result in a visible dark line horizontal to the PAD.

As described above, according to the techniques herein, calibration controller 108 may be configured to generate interferential patterns and analyze data from scanner 106 to detect errors in a printed interferential pattern compared to a defined interferential pattern. According to the techniques herein, detected errors may be used to determine if there are media advance errors and/or a misalignment between dies of respective printheads in adjacent rows. FIGS. 5A-5B are illustrations of interferential patterns of according to an example. In one example, the techniques described herein may be based on the interferential pattern illustrated in FIGS. 5A-5B. As illustrated in FIG. 5A, the example interferential pattern includes two parts, a first portion including horizontal lines also referred to as lines portion and a second portion including diagonal lines, also referred to as stairs portion. Essentially, the lines portion may be printed to a print media and the stairs portion may be subsequently printed on top of the lines portion (or vice-versa) to form the complete interferential pattern. As illustrated in FIG. 5A, if the horizontal lines and the stairs are accurately printed with respect to a reference, for example, a print media reference line perpendicular to PAD, the lines and stairs bisect (and a white column or whiter area is visible) about the center of the complete interferential pattern. As illustrated in FIG. 5B, if there is a deviation with respect to a reference when the horizontal lines and the stairs are printed, there is a shift (to the left in the example of FIG. 5B) where the lines and the stairs bisect. This shift can be correlated to the deviation. That is, the interferential pattern has dark areas at both sides and the length of the pattern is known. By comparing the measured signal between fiducials (i.e., the dark areas) and the expected length, positions can be located. A signal may be analyzed to detect a peak that corresponds with the whiter area, because the whiter area corresponds to the misalignment between the horizontal line and stairs at this position, the position of the white peak can be converted to a misalignment. For example, in one example, if the bisection of the lines and the stairs is shifted to the left by a distance of 9.5 mm it may be determined that stairs are printed 0.015 mm below an upper reference line.

Figure 5A:
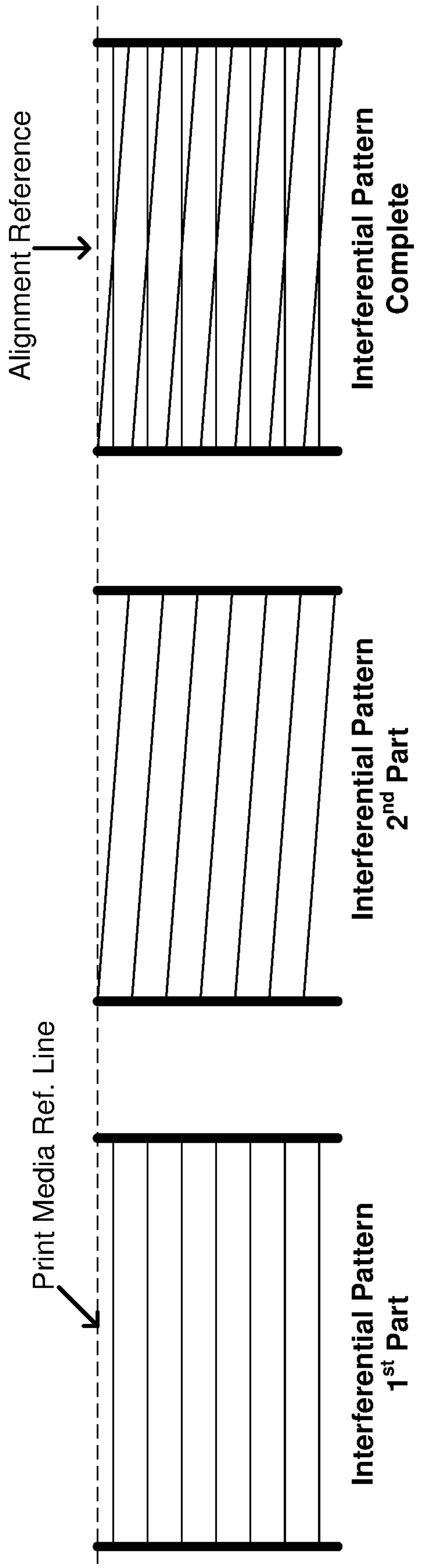
FIGS. 5A-5B are illustrations of interferential patterns of according to an example.
Figure 5B:
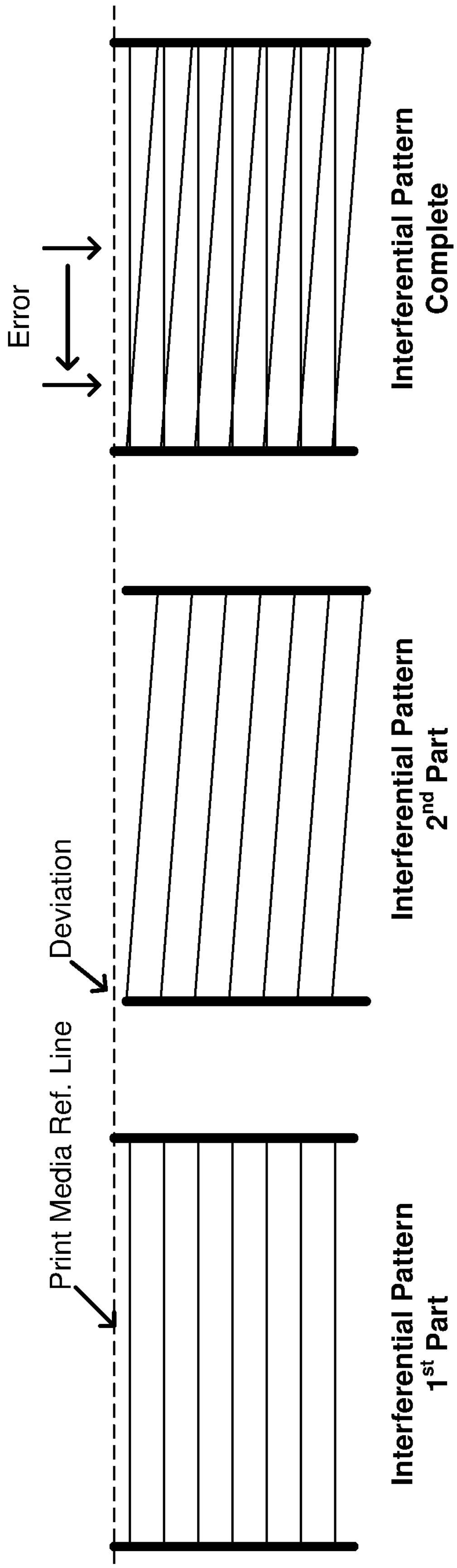

It should be noted that, for the sake of clarity, the interferential pattern illustrated in FIGS. 5A-5B may represent a simplified interferential pattern compared to an interferential pattern actually printed to a print media. For example, in one example, according to the techniques herein, a lines portion of an interferential pattern may include 56 horizontal lines having a thickness of 0.043 mm and a spacing of 0.30 mm and a stairs portion of the interferential pattern may include 56 lines having a thickness of 0.043 mm and a spacing of 0.275 mm, where each stair is approximately 1.8 mm wide and the distance between steps is 0.043 mm. Further, in one example the total width and height of the interferential pattern may be 20 mm by 16.6 mm. Finally, it should be noted that in one example, an interferential pattern may be printed using 784 nozzles in a column.

As described above, in one example, scanner 106 may include a line sensor with a field of view may be between 1 and 3 mm in both directions. As further described above, scanner 106 may be mounted to printhead carriage 102 at a position corresponding to a particular nozzle position. In one example, scanner 106 may be a line sensor centered at position corresponding to approximately nozzle position 80. In some cases, the configuration of an interferential pattern may be based on the capabilities of scanner 106. Further, it should be noted that in some examples, corresponding lines and stairs of an interferential pattern may be repeated as needed from robustness. Further, as described above, in some examples, scanner 106 may perform several scans at different PAD positions. For example, in the case where the interferential pattern is 20 mm by 16.6 mm and scanner 106 includes a line sensor with a field of view between 1 and 3 mm in both directions, calibration controller 108 may be configured to cause scanner 106 to perform 5 horizontal scans at every 3 mm. Further, for each scan, an error may be determined, for example, as described above, and calibration controller 108 may be configured to average the errors to generate an error measured in the interferential pattern N, i.e., $\varepsilon_N$.

As described above, for example with respect to FIGS. 4A-4B, for rows of printheads having a staggered alignment, a misalignment may include a deviation between the relative position of two adjacent rows about the PAD. Further, a misalignment may include a so-called media advance error. For example, referring to FIG. 1, it may be expected that print media P is to advance in 16.595 mm increments, however, during printing, print media P may actually advance in 16.658 mm increments. According to the techniques herein, calibration controller 108 may be configured to generate interferential patterns such that media advance errors and errors corresponding to the relative position of two adjacent rows can respectively be identified and corrected.

Figure 6A:
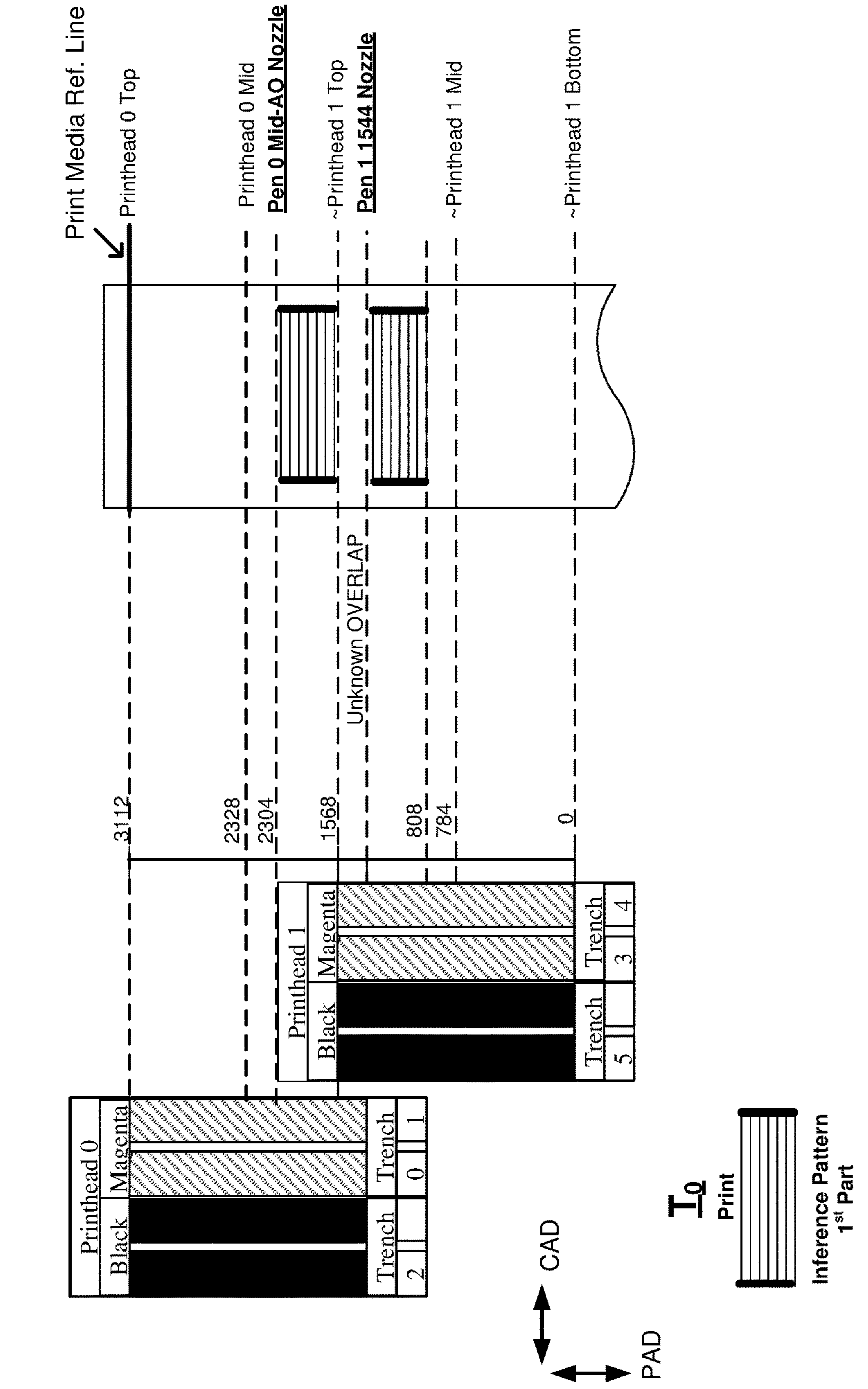
FIGS. 6A-6C are illustrations of generating interferential patterns according to an example.
Figure 6B:
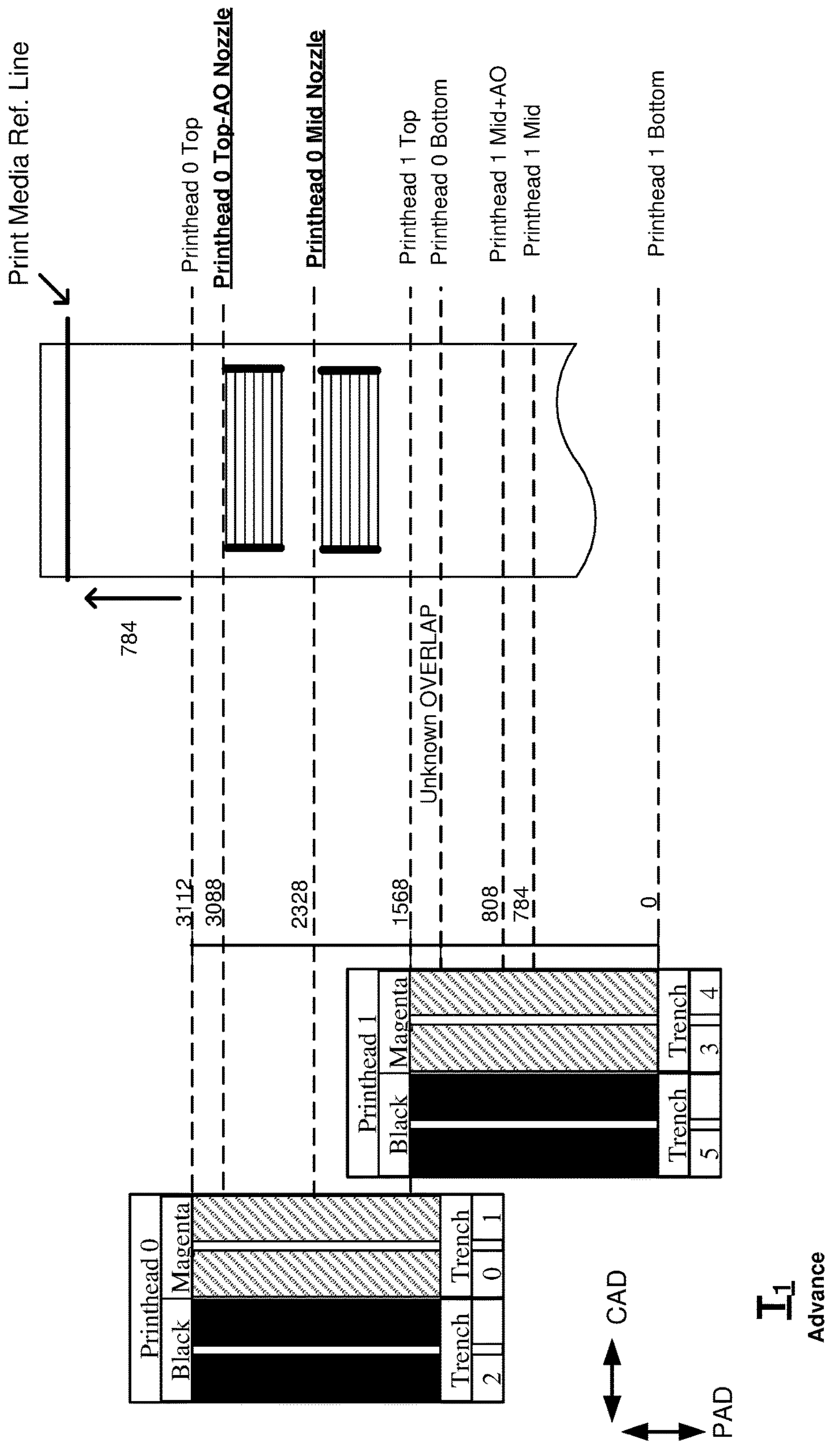
Figure 6C:
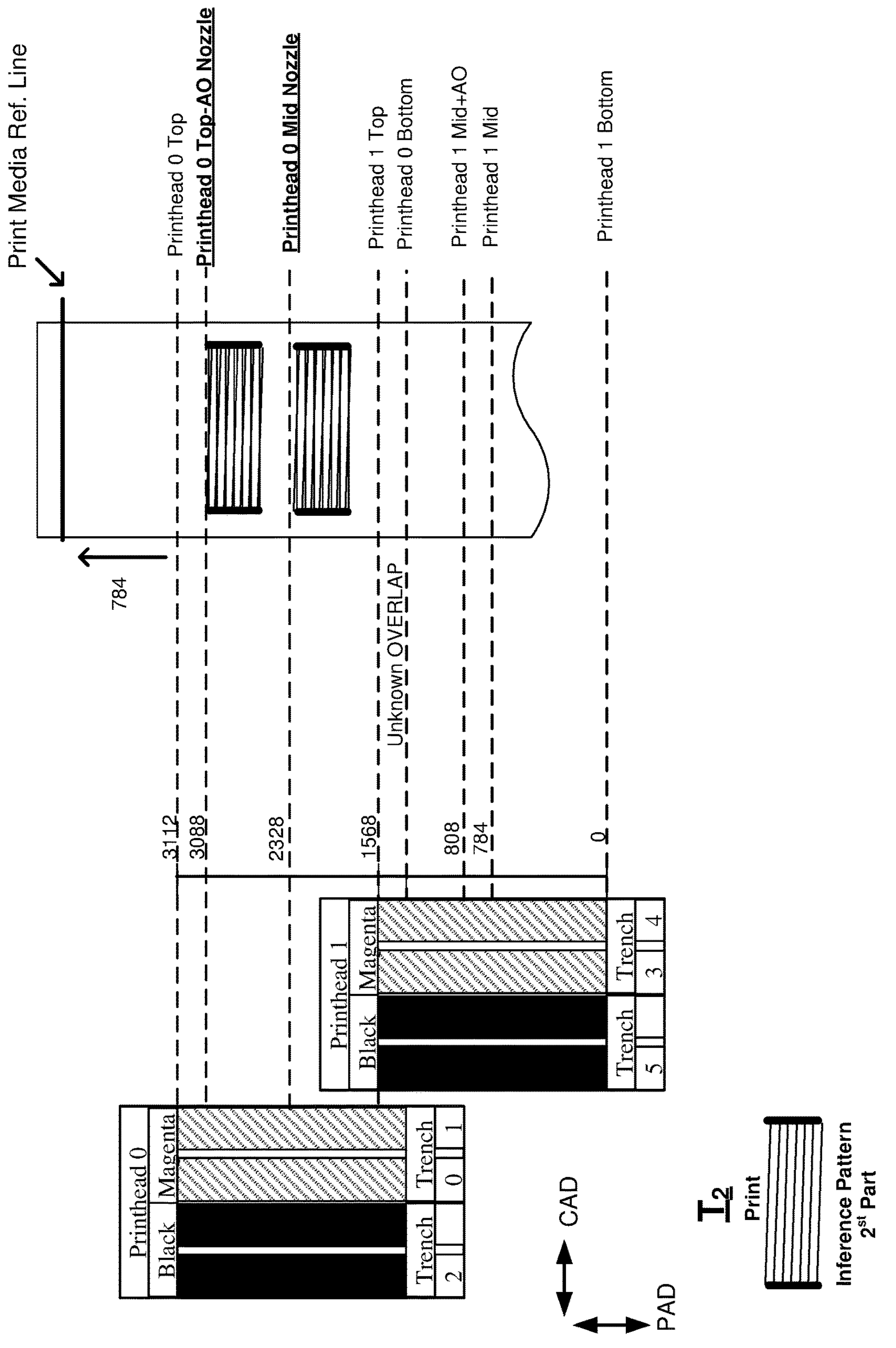

FIGS. 6A-6C are illustrations of generating interferential patterns according to an example. It should be noted that in the example illustrated in FIGS. 6A-6C, the printhead carriage architecture corresponds to the example described above with respect to FIG. 2 and FIG. 3 and the interferential patterns correspond to the example described above with respect to FIGS. 5A-5B. This is for illustrative purposes and, as described above, the techniques described herein may be generally applicable to various printhead carriage and printhead architectures, (i.e., any number of rows and various nozzle alignments of printheads) and various interferential patterns.

FIG. 6A illustrates a first relative time instance, $T_0$, where lines portions of two respective interferential patterns are printed to printed media. As illustrated in the example of FIG. 6A, the actual overlap between Printhead 0 and Printhead 1 is unknown. However, similar to the example illustrated in FIGS. 4A-4B, the position of the top nozzle of Printhead 0 at 3112 is illustrated as fixed for reference. In this manner, the midpoint of Printhead 0 can be identified as nozzle position 2328 (i.e., 3112−(1568/2)). In the example illustrated in FIG. 6A, a lines portion of an upper interferential pattern is printed with reference to the midpoint of Printhead 0 and the expected or aligned overlap (AO), i.e., 24 nozzles. That is, the top of the lines portion of the upper inferential pattern is aligned with nozzle position 2304 (i.e., 2328−24). That is, nozzle position 2304 is the alignment reference.

As described above, in the example of FIG. 6A, the actual overlap between Printhead 0 and Printhead 1 is unknown. That is, the bottom nozzle of Printhead 1 may or may not actually align with an absolute nozzle position 0, when the top nozzle of Printhead 0 is aligned with absolute nozzle position 3112. However, nozzle positions of Printhead 1 may be identifiable with respect to Printhead 1. That is, in the case where Printhead 1 includes 1568 nozzles per column, the midpoint of Printhead 0 can be identified as nozzle position 784 relative to the bottom nozzle of Printhead 1 and the top of Printhead 1 can be identified as nozzle position 1568 relative to the bottom nozzle of Printhead 1. In the example illustrated in FIG. 6A, a lines portion of an additional interferential pattern is printed with reference to the top of Printhead 1 and the aligned overlap (AO), (i.e., 24 nozzles). That is, the top of the lines portion of the additional inferential pattern is aligned with Printhead 1 nozzle position 1544 (i.e., 1568−24) relative to the bottom nozzle of Printhead 1.

FIG. 6B illustrates a second relative time instance, $T_1$, where lines portions of two respective interferential patterns have been printed to printed media and print media has been advanced about the PAD. In the example illustrated in FIGS. 6A-6C, after the lines portions are printed to media at $T_0$, the print media is advanced a distance corresponding to 784 nozzles. It should be noted that this represents a distance of half a die for a printhead with a die having 1568 nozzles in a column. Further, it should be noted that although the example described in FIGS. 6A-6C is described with respect to advancing print media half a die, in other examples alternative distances of advancement may be utilized. That is, for example, any distance that allows a portion of an additional interferential pattern to be printed using nozzles of an upper row and the other portion the additional interferential pattern to be printed using nozzles of a lower row may be utilized. Referring again to FIG. 6B, in this manner, the top of the upper interferential pattern is expected to be at a position corresponding to nozzle position 3088. That is, a position offset from the absolute nozzle position 3112 by the expected offset, i.e., 24 nozzles. It should be noted that in the example of FIGS. 6A-6C, the distance that the upper interferential pattern travels is confined within the height of Printhead 0. Thus, as described in further detail below, any errors in the upper interferential pattern may be used to identify a media advance error. As further illustrated in FIG. 6B, after the print media is advanced a distance corresponding to 784 nozzles, the top of the additional interferential pattern is expected, based on Printhead 0 and Printhead 1 having an expected overlap, to be in alignment with the midpoint of Printhead 0, nozzle position 2328, relative to absolute nozzle position 3112.

FIG. 6C illustrates a third relative time instance, $T_2$, where stairs portions of the two respective interferential patterns are printed to print media. It should be noted that the order in which lines and stairs portions are printed may be interchanged. As described above, after the print media is advanced a distance corresponding to 784 nozzles, the top of the upper interferential pattern is expected to be at a position corresponding to nozzle position 3088 with respect to absolute nozzle position 3112. Thus, as illustrated in FIG. 6C, the stairs portion of the upper interferential pattern is printed with respect to nozzle position 3088. As described above, the lines portion of the upper inferential pattern is printed with respect to its top being aligned with nozzle position 2304 with respect to absolute nozzle position 3112. Thus, in a case where, the print media is actually advanced a distance corresponding to 784 nozzles, the upper interferential pattern is expected to have minimal errors. That is, for example, as described above with respect to FIG. 5A, if the lines portion of upper interferential pattern is accurately printed with respect to the reference Printhead 0 nozzle position 2034 and if the stairs portion of upper interferential pattern is accurately printed with respect to the reference Printhead 0 nozzle position 3088, the upper interferential pattern should appear to indicate alignment. Because the die of Printhead 0 is fixed about its length, any errors in the upper interferential pattern can be assumed to be a result of the print media actually advancing more or less than the distance corresponding to 784 nozzles. Thus, any errors in the upper interferential pattern can be used to identify print media advance errors.

As described above, scanner 106 may include a line sensor performing multiple horizontal scans and based on the average of the error indicated for each scan, an error for the interferential pattern may be determined, i.e., $\varepsilon_N$. In one example according to the techniques herein, calibration controller 108 may be configured to determine an error $\varepsilon_U$ for the upper interferential error and determine a media advance error, i.e., $e_{av}$ based on $\varepsilon_U$. For example, calibration controller 108 may be configured to determine an error $\varepsilon_U$ of 2.5 mm to the left for the upper interferential pattern and determine that print media advanced a distance corresponding to 782 nozzles instead of a distance corresponding to 784 nozzles, based on a correlation, for example as described above with respect to FIGS. 5A-5B.

As described above, after the print media is advanced a distance corresponding to 784 nozzles, the top of the additional interferential pattern is expected to be at a position corresponding to nozzle position 2328 with respect to absolute nozzle position 3112. Thus, as illustrated in FIG. 6C, the stairs portion of the additional interferential pattern is printed with respect to nozzle position 2328. As described above, the lines portion of the additional inferential pattern is printed with respect to its top being aligned with Printhead 1 nozzle position 1544 relative to the bottom nozzle of Printhead 1. Thus, in a case where, the print media is actually advanced a distance corresponding to 784 nozzles and the overlap of Printhead 0 and Printhead 1 is the expected alignment, i.e., 24 nozzles, the additional interferential pattern is expected to have minimal errors. That is, for example, as described above with respect to FIG. 5A, if the lines portion of the additional interferential pattern is accurately printed with respect to the reference Printhead 1 nozzle 1544 being properly aligned with Printhead 0 (i.e., 1554 nozzle of Printhead 1 is aligned with bottom nozzle of Printhead 0) and if the stairs portion of additional interferential pattern is accurately printed with respect to the reference Printhead 0 nozzle position 2328, the additional interferential pattern should appear to indicate alignment. Thus, any errors in the additional interferential pattern may be a result of a media advance error and Printhead 0 and Printhead 1 being misaligned. However, as provided above, any errors in the upper interferential pattern can be used to identify print media advance errors. Because media advance errors are identified based on the upper interferential pattern, any errors in the additional interferential pattern can be used to identify misalignment between dies of respective printheads Printhead 0 and Printhead 1. That is, the identified media advance error (or $\varepsilon_U$) may be subtracted from the error in the additional interferential pattern to determine the error due to misalignment of Printhead 0 and Printhead 1.

As described above, scanner 106 may include a line sensor performing multiple horizontal scans and based on the average of the error indicated for each scan, an error for the interferential pattern may be determined, i.e., $\varepsilon_N$. In one example according to the techniques herein, calibration controller 108 may be configured to determine an error $\varepsilon_A$ for the additional interferential pattern and determine a total error, i.e., $e_T$ based on $\varepsilon_A$. For example, calibration controller 108 may be configured to determine an error $\varepsilon_A$ of 5 mm to the left for the additional interferential pattern. Calibration controller 108 may be configured to subtract a determined error for the upper interferential pattern, i.e, $\varepsilon_u$ (e.g., 2.5 mm) from $\varepsilon_A$ and determine an error corresponding to the misalignment of Printhead 0 and Printhead 1 (e.g., 0.043 mm). Alternatively, calibration controller 108 may be configured to subtract $e_{av}$ from $e_T$. For example, calibration controller 108 may be configured to determine an error $\varepsilon_U$ of 2.5 mm to the left for the upper interferential pattern and determine that print media advanced a distance corresponding to 782 nozzles instead of a distance corresponding to 784 nozzles and isolate 2.5 mm error from an error $\varepsilon_A$ of 5 mm to the left and determine that the dies of Printhead 0 and Printhead 1 (and thus, Row 0 and Row 1) are additionally misaligned in the PAD by a distance corresponding to 2 nozzles.

As described above, calibration controller 108 may be configured to counteract any determined media advance errors and/or the misalignment between dies of respective printheads. For example, calibration controller 108 may be configured to adjust printing by based on identified media advance errors and/or the misalignment between dies of respective printheads. For example, particular rows or nozzles may not be activated during a print job based on any misalignment. For example, when the overlap zone is less than expected, calibration controller 108 may be configured to such that some nozzles do not eject printing fluid, in order to avoid the appearance of a dark line.

Figure 7:
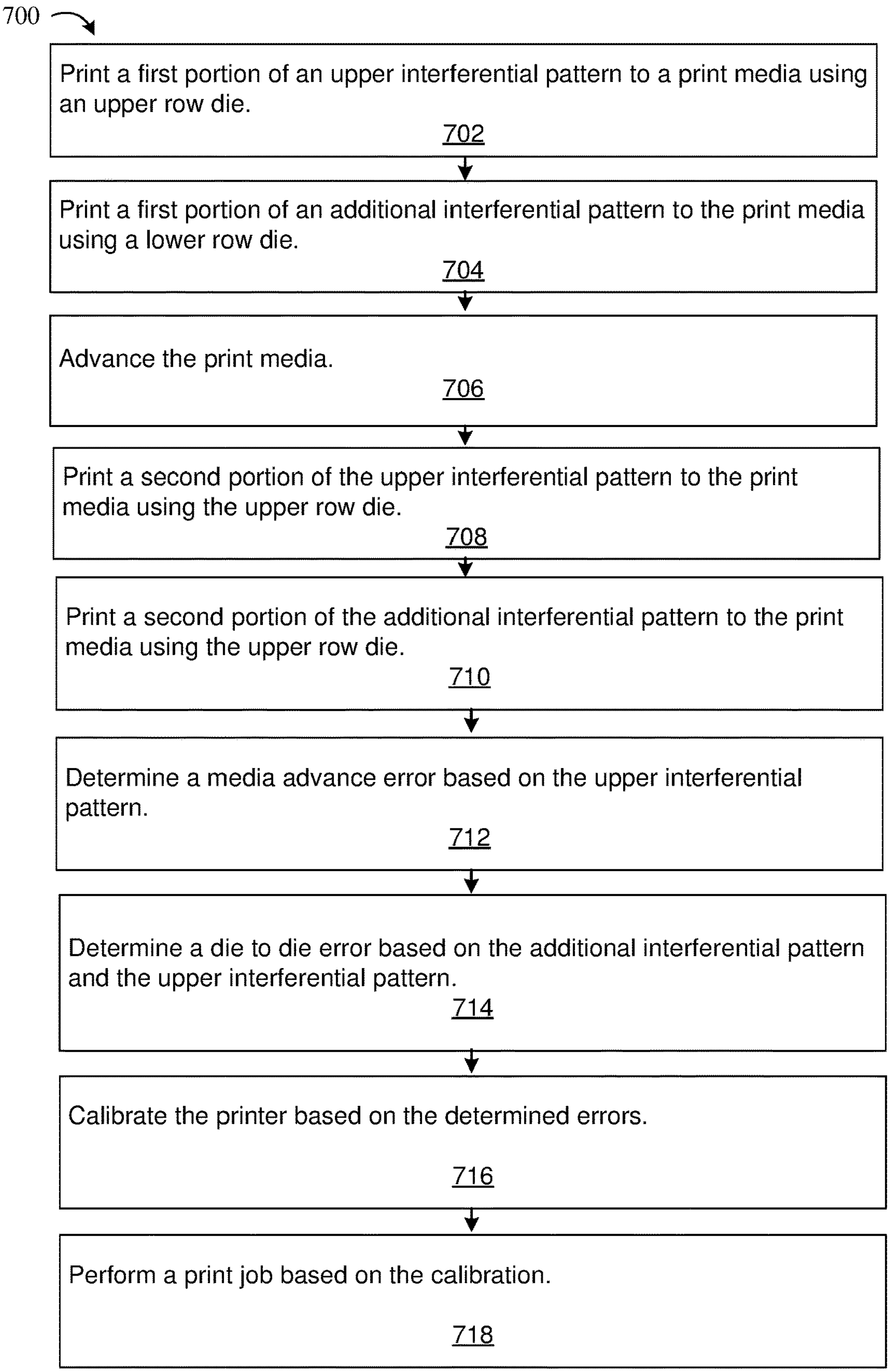
FIG. 7 is an illustration of a flowchart of an example method for generating interferential patterns according to an example.

FIG. 7 is an illustration of a flowchart of an example method for generating interferential patterns according to an example. The method 700 may generally be implemented in a printer device, such as, for example, the printer device 100 (FIG. 1). In an example, the method 700 may be implemented in computer readable instructions (e.g., software), configurable computer readable instructions (e.g., firmware), fixed-functionality computer readable instructions (e.g., hardware), etc., or any combination thereof.

Illustrated processing block 702 provides for printing a first portion of an upper interferential pattern to a print media using an upper row die. For example, a lines portion of an interferential pattern may be printed to a print media using a printhead in an upper row of staggered rows of printheads. For example, as described above with respect to FIGS. 6A-6C.

Illustrated processing block 704 provides for printing a first portion of an additional interferential pattern to a print media using a lower row die. For example, a lines portion of an interferential pattern may be printed to the print media using a printhead in a lower row of staggered rows of printheads. For example, as described above with respect to FIGS. 6A-6C.

Illustrated processing block 706 provides for advancing the print media. For example, the print media may be advanced in the PAD changing the relative positions of upper row die and lower row die with respect to the print media. For example, as described above with respect to FIGS. 6A-6C.

Illustrated processing block 708 provides for printing a second portion of the upper interferential pattern to the print media using the upper row die. For example, a stairs portion of an interferential pattern may be printed to the print media using the printhead in the upper row of staggered rows of printheads. For example, as described above with respect to FIGS. 6A-6C.

Illustrated processing block 710 provides for printing a second portion of the additional interferential pattern to a print media using the upper row die. For example, a stairs portion of an interferential pattern may be printed to the print media using the printhead in the upper row of staggered rows of printheads. For example, as described above with respect to FIGS. 6A-6C.

Illustrated processing block 712 provides for determining a media advance error value based on the upper interferential pattern. For example, an measured error in the upper interferential pattern may be correlated to a media advance error. For example, as described above with respect to FIGS. 6A-6C.

Illustrated processing block 714 provides for determining a die to die error based on the upper interferential pattern and additional interferential pattern. For example, a measured error in the lower interferential pattern may be correlated to a sum of a die to die error and the media advance error and the die to die error may be isolated by subtracting the media advance error. For example, as described above with respect to FIGS. 6A-6C.

Illustrated processing block 716 provides for calibrating a printer based on the determined errors. For example, counteracting measures may be based on the die to die error and the media advance error. For example, as described above with respect to FIGS. 6A-6C.

Illustrated processing block 718 provides for performing a print job based on a calibration. For example, after counteracting measures are provided, a print job may be perform. For example, as described above.

Figure 8:
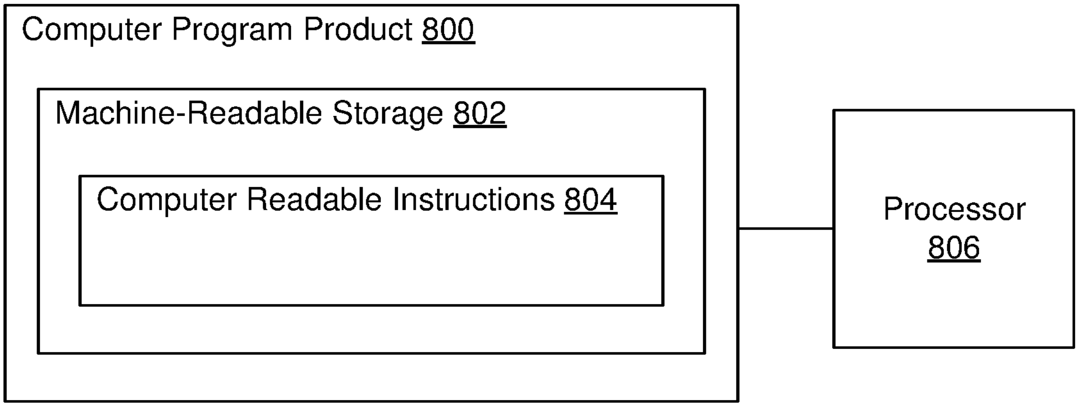
FIG. 8 is a block diagram illustrating a computer program product according to an example.

FIG. 8 illustrates a block diagram of an example computer program product 800. In some examples, as shown in FIG. 8, computer program product 800 includes a machine-readable storage 802 that may also include computer readable instructions 804. In some implementations, the machine-readable storage 802 may be implemented as a non-transitory machine-readable storage. In some implementations the computer readable instructions 804, which may be implemented as software, for example. In an example, the computer readable instructions 804, when executed by a processor 806, implement one or more aspects of the method 700 (FIG. 7).

Figure 9:
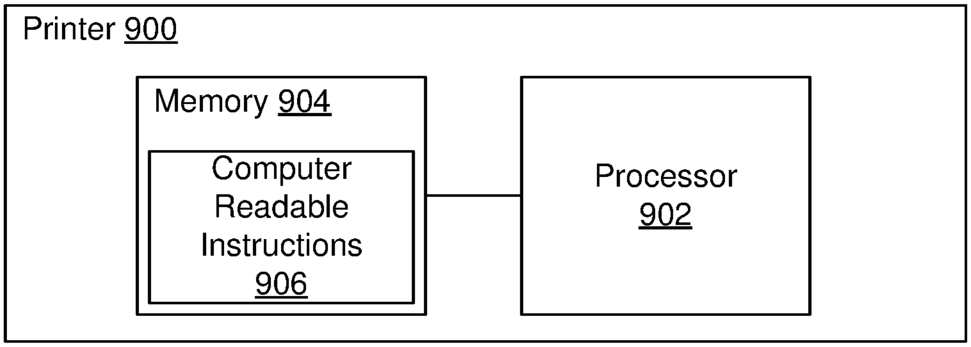
FIG. 9 is a block diagram illustrating an example fluid delivery apparatus according to an example.

FIG. 9 is a block diagram illustrating a hardware apparatus including a semiconductor package according to an example. FIG. 9 shows an illustrative example of the printer 900. In the illustrated example, the printer 900 may include a processor 902 and a memory 904 communicatively coupled to the processor 902. The memory 904 may include computer readable instructions 906, which may be implemented as software, for example. In an example, the computer readable instructions 906, when executed by the processor 902, implement one or more aspects of the method 700 (FIG. 7), described above.

In some implementations, the processor 902 may include a general purpose controller, a special purpose controller, a storage controller, a storage manager, a memory controller, a micro-controller, a general purpose processor, a special purpose processor, a central processor unit (CPU), the like, and/or combinations thereof.

Further, implementations may include distributed processing, component/object distributed processing, parallel processing, the like, and/or combinations thereof. For example, virtual computer system processing may implement one or more of the methods or functionalities as described herein, and the processor 902 described herein may be used to support such virtual processing.

In some examples, the memory 904 is an example of a computer-readable storage medium. For example, memory 904 may be any memory which is accessible to the processor 902, including, but not limited to RAM memory, registers, and register files, the like, and/or combinations thereof. References to "computer memory" or "memory" should be interpreted as possibly being multiple memories. The memory may for instance be multiple memories within the same computer system. The memory may also be multiple memories distributed amongst multiple computer systems or computing devices.

Figure 10:
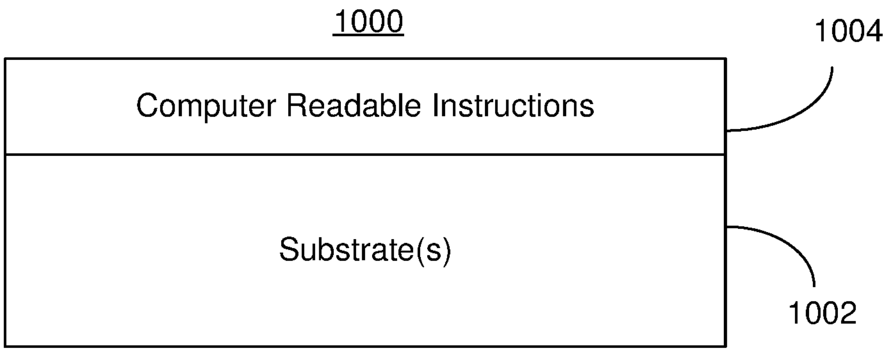
FIG. 10 is a block diagram illustrating a hardware apparatus including a semiconductor package according to an example.

FIG. 10 shows an illustrative semiconductor apparatus 1000 (e.g., chip and/or package). The illustrated apparatus 1000 includes one or more substrates 1002 (e.g., silicon, sapphire, or gallium arsenide) and computer readable instructions 1004 (such as, configurable computer readable instructions (e.g., firmware) and/or fixed-functionality computer readable instructions (e.g., hardware)) coupled to the substrate(s) 1002. In an example, the computer readable instructions 1004 implement one or more aspects of the method 700 (FIG. 7), described above.

In some implementations, computer readable instructions 1004 may include transistor array and/or other integrated circuit/IC components. For example, configurable firmware logic and/or fixed-functionality hardware logic implementations of the computer readable instructions 1004 may include configurable computer readable instructions such as, for example, programmable logic arrays (PLAs), field programmable gate arrays (FPGAs), complex programmable logic devices (CPLDs), or fixed-functionality computer readable instructions (e.g., hardware) using circuit technology such as, for example, application specific integrated circuit (ASIC), complementary metal oxide semiconductor (CMOS) or transistor-transistor logic (TTL) technology, the like, and/or combinations thereof.

As discussed above, some implementations described herein advantageously provide for technology that enables media advance errors and/or misalignment between dies to be determined. Additionally, or alternatively, the techniques described herein may provide for technology that is a solution for printers with any number of rows of printheads. Further, the techniques described herein may provide for technology that robustly addresses die to die misalignment.

All definitions, as defined and used herein, should be understood to control over dictionary definitions, definitions in documents incorporated by reference, and/or ordinary meanings of the defined terms.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples may be combined to form additional examples.

We claim:

1. A printer alignment calibration method, comprising:

printing a first portion of an upper interferential pattern to a print media using a first set of nozzles of an upper row die;

printing a second portion of the upper interferential pattern to the print media using a second set of nozzles of the upper row die;

printing a first portion of an additional interferential pattern to a print media using a lower row die;

printing a second portion of the additional interferential pattern to the print media using the upper row die; and determining an alignment error between the upper row die and the lower row die based on the upper interferential pattern and the additional interferential pattern.

2. The method of claim 1, further comprising determining a media advance error based on the upper interferential pattern.

3. The method of claim 1, wherein determining an alignment error between the upper row die and the lower row die includes:

measuring an error in the upper interferential pattern;

measuring an error in the additional interferential pattern;

subtracting the error in the upper interferential pattern from the error in the additional interferential pattern; and correlating the resulting different to an alignment error.

4. The method of claim 1, wherein the upper row die and the lower row die are arranged in an overlapping manner.

5. The method of claim 1, wherein the first set of nozzles of the upper row die include nozzles located in a lower half of the upper row die and the second set of nozzles of the upper row die include nozzles located an upper half of the upper row die.

6. The method of claim 5, wherein printing the first portion of the additional interferential pattern using the lower row die includes using a set of nozzles of located in an upper half of the lower row die; and wherein printing the second portion of the second interferential pattern using the upper row die includes using the first set of nozzles of the upper row die.

7. A printer alignment calibration device, for a printer, comprising:

a sensor;

an alignment controller coupled to the sensor, the alignment controller to cause the printer to:

print a first portion of an upper interferential pattern to a print media using a first set of nozzles of an upper row die;

print a second portion of the upper interferential pattern to the print media using a second set of nozzles of the upper row die;

print a first portion of an additional interferential pattern to a print media using a lower row die;

print a second portion of the additional interferential pattern to the print media using the upper row die; and determine an alignment error between the upper row die and the lower row die based on the upper interferential pattern and the additional interferential pattern.

8. The printer alignment calibration device of claim 7, the alignment controller to further determine a media advance error based on the upper interferential pattern.

9. The printer alignment calibration device of claim 8, wherein determining an alignment error between the upper row die and the lower row die includes:

measuring an error in the upper interferential pattern;

measuring an error in the additional interferential pattern;

subtracting the error in the upper interferential pattern from the error in the additional interferential pattern; and correlating the resulting different to an alignment error.

10. The printer alignment calibration device of claim 7, wherein the upper row die and the lower row die are arranged in an overlapping manner.

11. The printer alignment calibration device of claim 7, wherein the first set of nozzles of the upper row die include nozzles located in a lower half of the upper row die and the second set of nozzles of the upper row die include nozzles located an upper half of the upper row die.

12. The printer alignment calibration device of claim 7, wherein printing the first portion of the additional interferential pattern using the lower row die includes using a set of nozzles of located in an upper half of the lower row die; and wherein printing the second portion of the second interferential pattern using the upper row die includes using the first set of nozzles of the upper row die.

13. A non-transitory computer-readable storage medium comprising a set of computer-readable instructions stored thereon, which when executed by a processor of a printing system, cause the processor to cause the printing system to:

print a first portion of an upper interferential pattern to a print media using a first set of nozzles of an upper row die;

print a second portion of the upper interferential pattern to the print media using a second set of nozzles of the upper row die;

print a first portion of an additional interferential pattern to a print media using a lower row die;

print a second portion of the additional interferential pattern to the print media using the upper row die; and determine an alignment error between the upper row die and the lower row die based on the upper interferential pattern and the additional interferential pattern.

14. The medium of claim 13, to further cause the processor to determine a media advance error based on the upper interferential pattern.

15. The medium of claim 13, wherein determining an alignment error between the upper row die and the lower row die includes:

measuring an error in the upper interferential pattern;

measuring an error in the additional interferential pattern;

subtracting the error in the upper interferential pattern from the error in the additional interferential pattern; and correlating the resulting different to an alignment error.

* * * * *